United States Patent
Goodwin

(10) Patent No.: US 7,403,481 B1
(45) Date of Patent: Jul. 22, 2008

(54) METHODOLOGY AND APPARATUS FOR SOLVING LOCKUP CONDITIONS WHILE TRUNKING IN FIBRE CHANNEL SWITCHED ARBITRATED LOOP SYSTEMS

(75) Inventor: William P. Goodwin, Bothell, WA (US)

(73) Assignee: Emulex Design & Manufacturing Corporation, Costa Mesa, CA (US)

( * ) Notice: Subject to any disclaimer, the term of this patent is extended or adjusted under 35 U.S.C. 154(b) by 845 days.

(21) Appl. No.: 10/769,580

(22) Filed: Jan. 30, 2004

(51) Int. Cl.
*G01R 31/08* (2006.01)

(52) U.S. Cl. ............... 370/235; 370/231; 370/412; 370/461

(58) Field of Classification Search ......... 370/229–236, 370/400–406, 411–420, 389, 392, 532–542, 370/459–463; 710/200, 316; 707/1; 709/201, 709/235, 238; 711/152, 147, 163
See application file for complete search history.

(56) References Cited

U.S. PATENT DOCUMENTS

| | | | |
|---|---|---|---|
| 6,292,488 B1 * | 9/2001 | Filgate | 370/229 |
| 7,110,414 B2 * | 9/2006 | Coffey | 370/403 |
| 2002/0159446 A1 * | 10/2002 | Foster et al. | 370/357 |
| 2003/0174722 A1 * | 9/2003 | Black et al. | 370/403 |
| 2005/0251500 A1 * | 11/2005 | Vahalia et al. | 707/1 |

* cited by examiner

*Primary Examiner*—Doris To
*Assistant Examiner*—Ian N Moore
(74) *Attorney, Agent, or Firm*—Morrison & Foerster LLP

(57) ABSTRACT

Lockup conditions are solved while trunking in Fibre Channel switched arbitrated loop systems. Within a particular switch, a particular combination of pending OPN conditions is detected, indicating a lockup condition. At least one of the detected pending OPN conditions is closed, which alleviates the lockup condition.

5 Claims, 4 Drawing Sheets

METHODOLOGY AND APPARATUS FOR SOLVING LOCKUP CONDITIONS WHILE TRUNKING IN FIBRE CHANNEL SWITCHED ARBITRATED LOOP SYSTEMS

CROSS-REFERENCE TO RELATED APPLICATIONS

The present patent application is related to U.S. patent application Ser. No. 10/617,149 (the '149 application), entitled "Methods And Apparatus For Trunking In Fibre Channel Arbitrated Loop Systems" and filed on Jul. 10, 2003, the contents of which are incorporated herein by reference in their entirety. The '149 application claims priority to U.S. patent application Ser. No. 10/612,753 filed on Jul. 1, 2003, which claims priority to U.S. patent application No. 60/393,164 filed on Jul. 2, 2002.

The present patent application is also related to U.S. patent application Ser. No. 10/616,862 (the '862 application), entitled "Methods And Apparatus For Device Access Fairness In Fibre Channel Arbitrated Loop Systems" and filed on Jul. 10, 2003, the contents of which are incorporated herein by reference in their entirety.

STATEMENT REGARDING FEDERALLY SPONSORED RESEARCH OR DEVELOPMENT

Not applicable.

REFERENCE TO A COMPACT DISK APPENDIX

Not applicable.

BACKGROUND

The '149 application (cited above in the RELATED APPLICATIONS section) describes employing trunking in a Fibre Channel network topology. Fibre Channel is a American National Standards Institute (ANSI) set of standards which describes a high performance serial transmission protocol which supports higher level storage and networking protocols.

The '149 application describes, in the context of a Fibre Channel topology, trunking capabilities for backend storage array designs. For example, the '149 application describes, with reference to FIG. 27 of the '149 application, multiple duplicate cascades between Loop Switches in switching mode, to increase throughput between adjacent Loop Switches. FIG. 27 of the '149 application is reproduced herein as FIG. 1.

The duplicate cascades can be simultaneously activated without creating an invalid loop topology. Furthermore, load balancing between the cascades on an initiator basis is supported. In a system with two initiators and a primary/duplicate cascade pair, each initiator can have a logical cascade chain dedicated to it providing approximately 2× the throughput of a single cascade system.

Referring to FIG. 1 as an example, initiator HBA1 1801 has a full bandwidth path 1813, 1829, 1831 thru the string of SBODs 1803, 1804, 1805. Initiator HBA2 1802 also has a full bandwidth path 1814, 1830, 1832 thru the string of SBODs 1803, 1804, 1805. Simultaneous communication between HBA1 and a disk in an SBOD and HBA2 and a disk in an SBOD can occur. For example, HBA1 can communicate with Disk 1 1817 in SBOD 1803 using the path 1813, 1817 at the same time HBA2 1802 can communicate with Disk 16 1819 in SBOD 1803 using the path 1814, 1819. The number of duplicate cascades in a trunk is not limited by the hardware. A trunk group could be defined as 21 trunks in a 22 port ASIC if so desired (I port must not be assigned to the trunk to provide the other side of the connection). If more initiators than cascades are added, throughput is affected based on the relative traffic assigned to each trunk within a group.

Load balancing among trunks is also discussed in the '149 application. Broadly speaking, most trunking implementations operate in either an autonomous or dynamic mode to balance traffic among trunks. Autonomous methods of load balancing generally assign trunks statically (for example, using round robin assignments). Dynamic load balancing actively monitors traffic on trunks and reassigns traffic flows to balance loads.

It is desired to minimize lockup conditions when initiating connections on the trunks.

BRIEF SUMMARY

Lockup conditions are solved while trunking in Fibre Channel switched arbitrated loop systems. Within a particular switch, a particular combination of pending OPN conditions is detected, indicating a lockup condition. At least one of the detected pending OPN conditions is closed, which alleviates the lockup condition.

DETAILED DESCRIPTION

Figure 1:
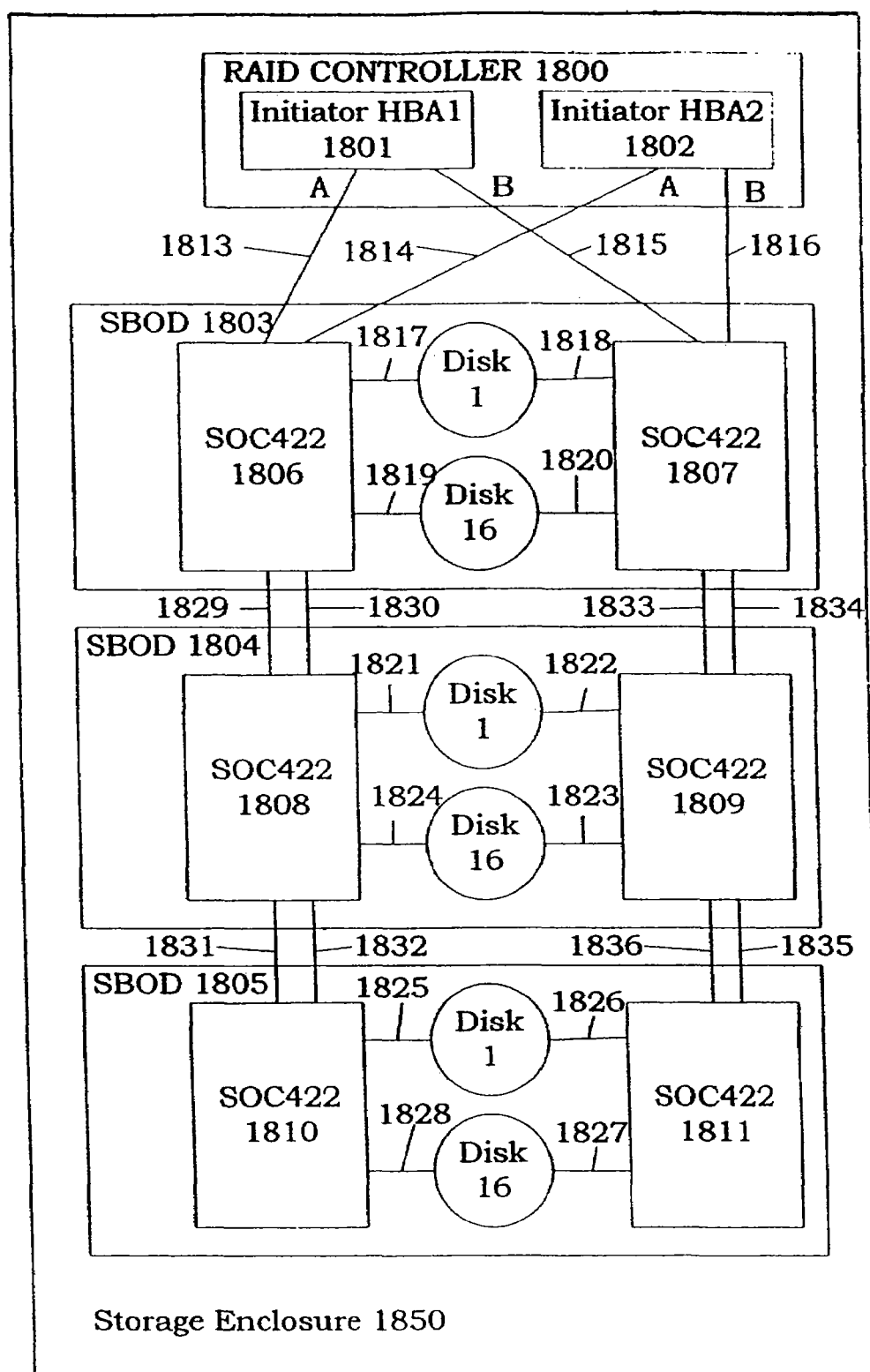
FIG. 1 illustrates a trunking configuration in a Fibre Channel networking topology.
Figure 2:
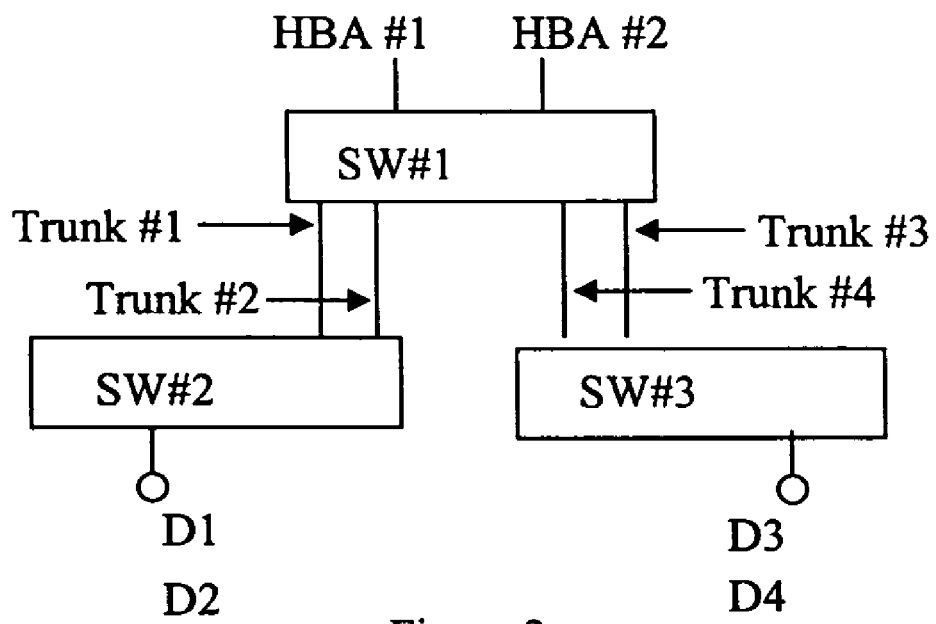
FIG. 2, in conjunction with Table 1, illustrates a lockup condition occurring where multiple trunks are utilized in a switched arbitrated loop system.

FIG. 2 illustrates a lockup condition occurring in a situation where multiple trunks are utilised in a switched arbitrated loop system such as is described in the Background with reference to FIG. 1. In particular, with such a system, in some circumstances, traffic may stop until a disk or HBA times out and closes a connection. This can degrade performance to a level of unacceptability. One example of the problem is described with reference to FIG. 2.

However, before discussing the lockup condition with reference to FIG. 2, several terms are explained.

a) Pending Open: Assume that HBA#2 wants to connect to D1. First HBA#2 ARB's for the port it is connected to and SW#1 will pass it's ARB back to HBA#2. HBA#2 now has won arbitration and now can send its OPN, which is then received by SW#1. SW#1 now has a Pending Open on the port to which HBA#2 is physically connected.

b) Connection: Once there is a pending open, the router in SW#1 performs a lookup to determine if the destination port of the OPN is busy or free. If the destination port is free, then the router connects the switch matrix of SW#1 to the destination port. It is now said there is a Connection between HBA#2 and the OPN's destination port.

We now turn to discussing a particular example of a lockup condition with reference to FIG. 2 and Table 1. With reference to Table 1, assume that HBA#1 (source) wants to connect to D3 (destination), and HBA#2 wants to connect to D1. In addition, D2 wants to connect to HBA#1 and D4 wants to connect to HBA#2. All of these devices are attempting to make the connection.

TABLE 1

| Source | Destination | Trunk | SW1 | SW2 | SW3 |
|--------|-------------|-------|-----------|-----------|-----------|
| HBA#1  | D3          | T#4   | Connected |           | Pending   |
| HBA#2  | D1          | T#2   | Connected | Pending   |           |
| D2     | HBA#1       | T#1   | Pending   | Connected |           |
| D4     | HBA#2       | T#3   | Pending   |           | Connected |

Furthermore, while the state of SW3 for the D4 to HBA#2 attempted connection is "connected," the state of SW1 for this attempted connection is "pending." This is a result of a previous attempted connection from HBA#2 to D1. That is, as can be seen in the row entry for HBA#2 to D1 in Table 1, the state of SW1 for this attempted connection is "connected," which prevents completion in SW1 for the D4 to HBA#2 attempted connection.

The D2 to HBA#1 connection is "connected" in SW2 but "pending" in SW1. The "pending" state in SW1 is a result of the "connected" state in SW1 of the HBA#1 to D3 attempted connection. Turning again to the HBA#2 to D1 attempted connection, as discussed above, the state of SW1 for this attempted connection is "connected." However, the "connected" state in SW2 of the D2 to HBA#1 attempted connection prevents completion in SW2 of the HBA#2 to D1 attempted connection. Thus, the state of SW2 for the HBA#2 to D1 attempted connection is "pending."

As a result, there is deadlock on SW1, since all pending OPN's are locked up on all four Trunks waiting for each other to complete a connection, which cannot happen.

One way to address the lockup condition is to detect it and clear it. A way of detecting the above condition would be—in SW#1—to detect the following state:

a) Pending OPN on either Trunk#1 or Trunk#2;

b) Pending OPN on either Trunk#3 or Trunk#4;

c) For each of the pending OPN's described in a) and b), the destination is already in a connection on SW1.

d) The pending OPN's and connections in c) have not seen a RRDY or SOF in a specified amount of time.

To clarify d), seeing a RRDY or SOF would indicate that communication is occurring over the attempted connection. Similarly, the absence of an RRDY or SOF indicates that communication is not occurring over the attempted connection. One way to clear the lockup condition, when detected, is to CLS one of the pending OPN's to allow the other pending OPN's to connect to their destinations.

Figure 3:
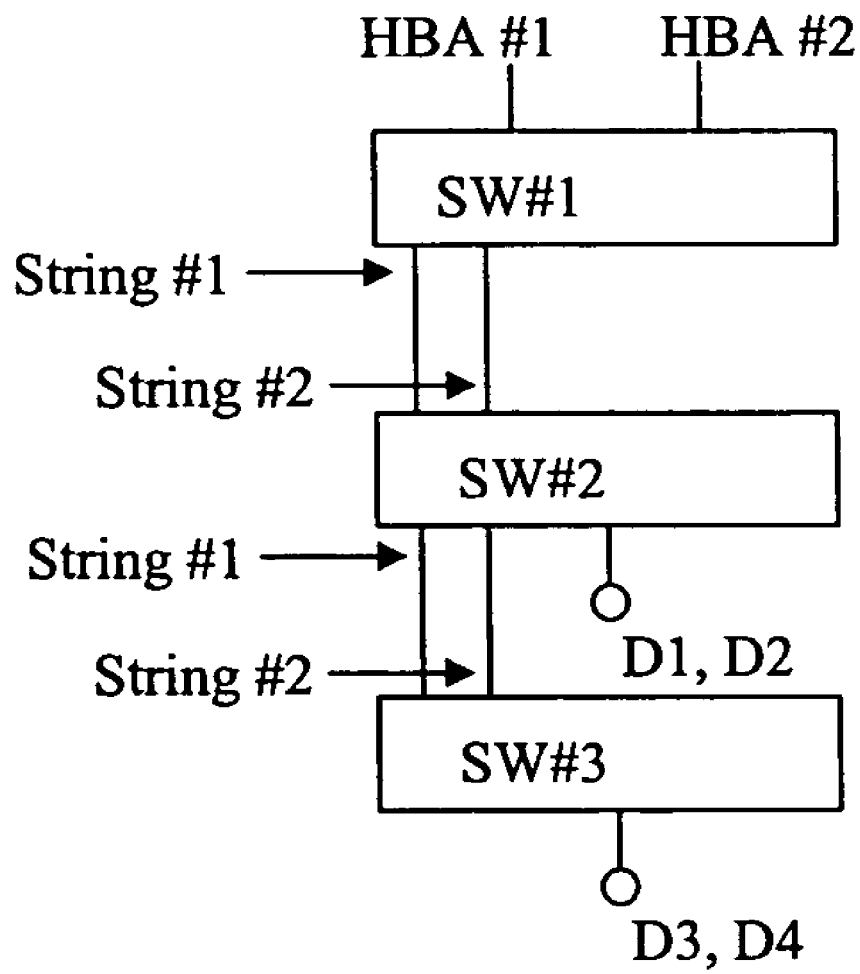
FIG. 3 illustrates a configuration in which a lockup condition occurs in a configuration where switches are connected together by string ports.

A second example of a lockup situation is illustrated in FIG. 3.

Another term is explained:

a) Close counter: Assume that D2 wants to connect to HBA#2, but the connection, is closed down by a higher priority OPN from String#1. Since D2 was unable to send a frame, the Close counter gets incremented. D2 will retry and send another OPN in which it also gets closed down without sending a frame and the Close counter gets incremented again. If the close counter reaches a predefined max value, then D2 gets highest priority on the connection attempt. For more discussion of the Close counter, reference is made to the '862 application (cited above in the RELATED APPLICATIONS section).

We now turn to another example of a lockup condition. In the FIG. 3 configuration, there are 3 switches connected together by string ports. HBA#1 wants to connect to D1 and HBA #2 wants to connect to D3. D2 has a pending OPN on its port, and D4 has a pending OPN on its port. The pending OPN's of both D2 and D4 have their Close counters at max value.

In one scenario, HBA#1 then ARB's for String#1 and wins, so HBA#1 sends an OPN that reaches SW#2 on String#1. The OPN sent by HBA#1 is now pending, because the pending OPN from D2 cannot be closed down, due to the Close counter for D2 reaching max value. HBA#2 now ARB's for String#2 and wins, so HBA#1 sends an OPN that reaches SW#3 on String #2. The OPN sent by HBA#2 is now pending because the pending OPN from D4 cannot be closed due to the Close counter for D4 reaching max value. There is now a lockup condition in which both String #1 and String #2 have been locked up. Traffic is stopped.

To address the stoppage of traffic, the lockup condition may be detected and cleared. A way of detecting the above condition includes detecting the following states with respect to SW#2:

a) Pending OPN on one of String#1 and String#2;

b) A connection on the other of String#1 and String#2, that has not seen a RRDY or a SOF in a specified amount of time;

c) A pending OPN on a port other than on String#1 or String#2, and the destination of the OPN is either String#1 or String#2 and d) The pending OPN described in c) has its Close counter at max value.

If the above conditions are met, then there is a lockup condition and one of the pending OPN's can be CLS'ed down to allow the other pending OPN's to connect to their destinations.

Figure 4:
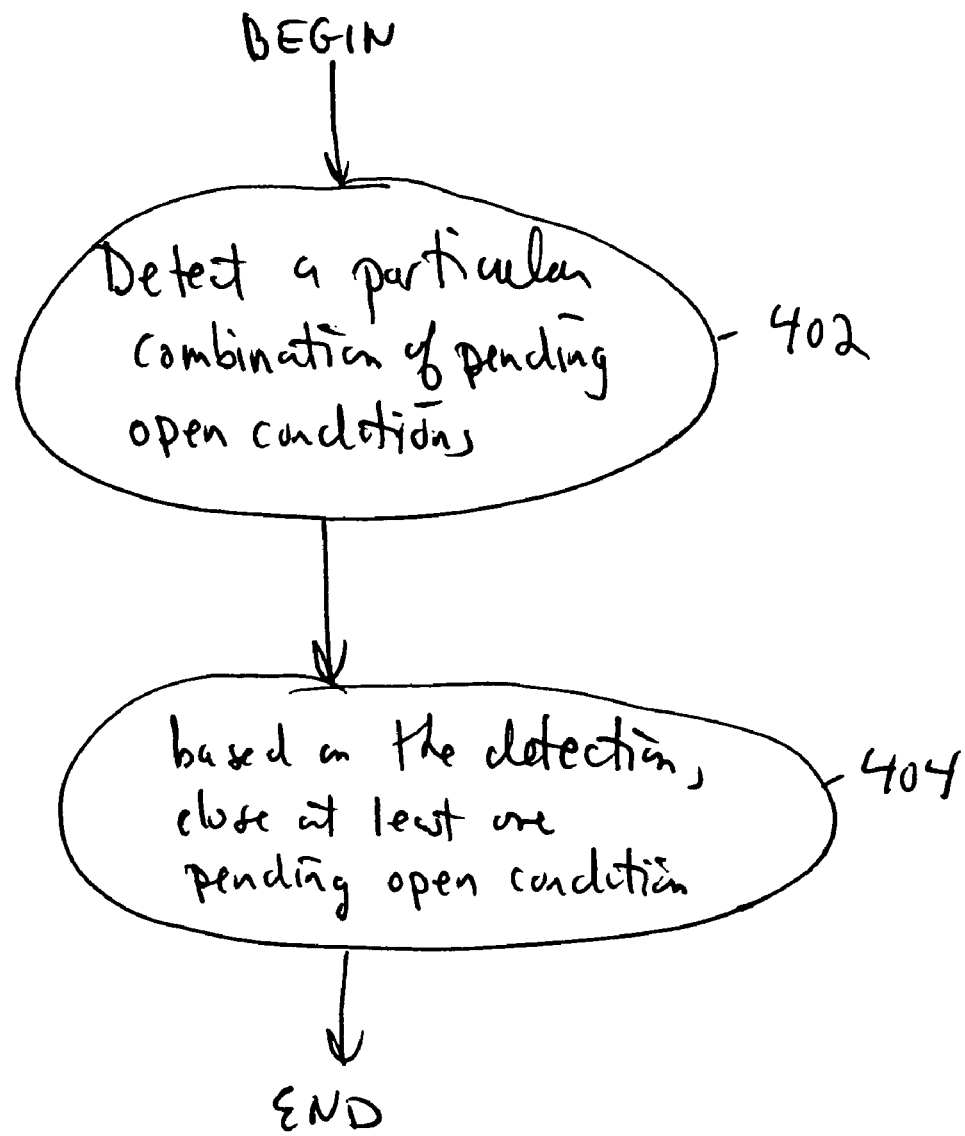
FIG. 4 broadly illustrates a method to detect and alleviate a lockup condition.

FIG. 4 illustrates, in accordance with a broad aspect, a method to solve lockup conditions while trunking in Fibre Channel switched arbitrated loop systems. The method operates within a particular switch of, for example, the FIG. 2 or FIG. 3 configuration. At step 402, a particular combination of pending OPN conditions is detected, indication a lockup condition. At step 404, at least one of the detected pending OPN conditions is closed, which alleviates the lockup condition.

What is claimed as new and desired to be protected by Letters Patent of the United States is:

1. In a switched arbitrated loop system with multiple trunks including strings, configured for communication using the Fibre Channel protocol, a method to address lockup conditions, comprising:

a) with respect to a particular switch in the system, detecting a particular combination of a plurality of pending open conditions on the multiple trunks indicating a lockup condition, wherein step a) further comprises:

a1) detecting that, with respect to the particular switch, there is a pending open at a first port on at least one particular one of the strings and a connection on one of a first and second port for at least another of the strings; and a2) detecting at least one port not detected in a1) having a destination that is a connection on at least one string detected in a1) wherein the pending open on the port detected in a2) has a close counter at maximum value; and b) based on the detection, closing at least one of the plurality of pending open conditions, thereby alleviating the lockup condition.

2. The method of claim 1, wherein:

step a) further includes detecting, for particular ones of the multiple trunks on which there is a connection, a lack of data communication on those trunks.

3. The method of claim 2, wherein:

detecting a lack of data communication on a particular trunk includes detecting that a particular type of signal has not been detected on that particular trunk for a predetermined period of time.

4. The method of claim 3, wherein:

the particular type of signal includes a Receiver Ready primitive and a Start of Frame delimiter.

5. The method of claim 2, wherein:

with respect to the particular switch, the trunks are configured into groups of multiple trunks; and the particular condition includes, for each of the groups of multiple trunks, at least one of the trunks being characterized by a pending open condition and at least one other of the trunks being characterized by a lack of data communication thereon.

* * * * *